United States Patent
Tang

(10) Patent No.: US 12,392,977 B2
(45) Date of Patent: Aug. 19, 2025

(54) OPTICAL FIBER CONNECTION METHOD AND DEVICE, STORAGE MEDIUM, AND ELECTRONIC DEVICE

(71) Applicant: ZTE CORPORATION, Shenzhen (CN)

(72) Inventor: Ningfeng Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 237 days.

(21) Appl. No.: 18/252,449

(22) PCT Filed: Sep. 14, 2021

(86) PCT No.: PCT/CN2021/118330
§ 371 (c)(1),
(2) Date: May 10, 2023

(87) PCT Pub. No.: WO2022/105396
PCT Pub. Date: May 27, 2022

(65) Prior Publication Data
US 2023/0408780 A1  Dec. 21, 2023

(30) Foreign Application Priority Data
Nov. 19, 2020  (CN) .......................... 202011303734.9

(51) Int. Cl.
*H04B 10/00* (2013.01)
*G02B 6/43* (2006.01)

(52) U.S. Cl.
CPC ..................... *G02B 6/43* (2013.01)

(58) Field of Classification Search
CPC .......... G02B 6/43; G02B 6/4292; G02B 6/42; H04B 10/801
See application file for complete search history.

(56) References Cited

U.S. PATENT DOCUMENTS 10,571,635 B1 * 2/2020 Leigh ................. H04Q 11/0005
10,826,613 B1 * 11/2020 Liang ..................... B60G 15/02
(Continued)

FOREIGN PATENT DOCUMENTS

CN  103744158 A  4/2014
CN  108462530 A  8/2018
(Continued)

OTHER PUBLICATIONS

International Searching Authority. International Search Report and Written Opinion for PCT Application No. PCT/CN2021/118330 and English translation, mailed Dec. 14, 2021, pp. 1-10.
(Continued)

*Primary Examiner* — Agustin Bello
(74) *Attorney, Agent, or Firm* — Vivacqua Crane, PLLC

(57) ABSTRACT

An optical fiber connection method and device, a storage medium and an electronic device are disclosed. The optical fiber connection device may include a first high-density optical connector, connected to a first optical interconnection unit and an external light source, and configured to collect N optical fibers connected to both the first optical interconnection unit and the external light source, and connect the collected N optical fibers to a second high-density optical connector, K second optical interconnection units and the external light source; and the second high-density optical connector, through which the first high-density optical connector is connected to the K second optical interconnection units.

10 Claims, 8 Drawing Sheets

(56) References Cited

U.S. PATENT DOCUMENTS

| | | | |
|---|---|---|---|
| 10,871,618 B2* | 12/2020 | Raza | G02B 6/3885 |
| 11,121,776 B2* | 9/2021 | Aboagye | G02B 6/423 |
| 11,159,240 B1* | 10/2021 | Di Mola | H04L 27/34 |
| 11,165,509 B1* | 11/2021 | Nagarajan | H01L 23/5384 |
| 11,178,473 B1* | 11/2021 | Nagarajan | H04B 10/40 |
| 11,432,056 B1* | 8/2022 | Doerr | G02B 6/421 |
| 2008/0118202 A1* | 5/2008 | Kato | G02B 6/43 385/14 |
| 2010/0195955 A1 | 8/2010 | Burnham et al. | |
| 2012/0246351 A1* | 9/2012 | Sybesma | G06F 3/00 361/679.01 |
| 2016/0192044 A1* | 6/2016 | Raza | H04Q 11/0066 398/49 |
| 2018/0259722 A1* | 9/2018 | Raza | G02B 6/3893 |
| 2019/0086618 A1* | 3/2019 | Shastri | H01R 12/721 |
| 2020/0279840 A1* | 9/2020 | Janta-Polczynski | G02B 6/30 |
| 2021/0044356 A1* | 2/2021 | Aboagye | G02B 6/423 |
| 2022/0029379 A1* | 1/2022 | Kovsh | H01S 5/50 |
| 2023/0408780 A1* | 12/2023 | Tang | G02B 6/43 |

FOREIGN PATENT DOCUMENTS

| | | |
|---|---|---|
| CN | 110261974 A | 9/2019 |
| CN | 110546539 A | 12/2019 |
| JP | 2014142659 A | 8/2014 |
| JP | 2019066768 A | 4/2019 |

OTHER PUBLICATIONS

Japan Patent Office. Notice of Reasons for Refusal for JP Application No. 2023-528511 and English translation, mailed May 7, 2024, pp. 1-8.

* cited by examiner

OPTICAL FIBER CONNECTION METHOD AND DEVICE, STORAGE MEDIUM, AND ELECTRONIC DEVICE

CROSS-REFERENCE TO RELATED APPLICATION

This application is a national stage filing under 35 U.S.C. § 371 of international application number PCT/CN2021/118330, filed Sep. 14, 2021, which claims priority to Chinese patent application No. 202011303734.9 filed Nov. 19, 2020. The contents of these applications are incorporated herein by reference in their entirety.

TECHNICAL FIELD

Embodiments of the present disclosure relate to the field of communication, in particular to an optical fiber connection method and device, a storage medium, and an electronic device.

BACKGROUND

With the increase of interconnection rate, there arises a series of problems in electrical interconnection between line cards or white boxes, such as power consumption, system capacity/density, interconnection rate, channel capacity and so on. In some technical schemes, the Co-Packaged Optics (CPO) is adopted to solve the problems in interconnection between line cards or white boxes, that is, information to be transmitted is transmitted to an optical engine in a CPO chip through a short-distance Serdes, and then transferred to optical interconnection units through optical fibers.

In the above-mentioned optical interconnection units to be interconnected, there are generally one or more CPO chips to realize the connection between the optical interconnection units, and these CPO chips include one or more optical engines and Application Specific Integrated Circuit (ASIC) processors. One optical engine has an optical cable with an optical connector, that is, each optical interconnection unit has a fixed optical connector of an optical engine. For example, if there are eight optical engines, eight optical cables and eight corresponding multi-core optical connectors may be output. These optical cables may contain multiple optical fibers, for example, 256 optical fibers. These optical fibers may be divided into two categories in function, one category is configured for optical information transceiving, and the other category is configured for input of external light sources of the optical engines.

For the optical fibers configured for optical information transceiving, when these optical interconnection units are networked or connected, there is often a mismatch in number between the interconnected optical interconnection units and these multi-core optical connectors. Meanwhile, in some long-distance interconnection (for example, 2 km) between the optical interconnection units, the optical fibers that come with the optical engines usually cannot reach such a long distance.

The optical fibers configured for input of external light sources of the optical engines are usually connected to a local laser. Because the optical fibers configured for optical information transceiving are mainly for external connection, new requirements are put forward for the connection mode of these two categories of optical fibers.

Therefore, in some technical schemes, there are problems of low networking efficiency of optical interconnection units, and complex connection.

In view of the above technical problems, no effective solution has been proposed.

SUMMARY

Embodiments of the present disclosure provide an optical fiber connection method and device, a storage medium and an electronic device, so as to solve, at least to a certain extent, one of the related technical problems, including the problems of low networking efficiency of optical interconnection units, and complex connection.

According to an embodiment of the present disclosure, an optical fiber connection device is provided. The device may include: a first high-density optical connector, connected to a first optical interconnection unit and an external light source and configured to collect N optical fibers connected to both the first optical interconnection unit and the external light source and connect the collected N optical fibers to a second high-density optical connector, K second optical interconnection units and the external light source, where N and K are both natural numbers greater than or equal to 1, and the external light source is configured to provide a modulated light source for the first optical interconnection unit; and the second high-density optical connector, through which the first high-density optical connector is connected to the K second optical interconnection units, where the K second optical interconnection units are configured to be networked by means of optical information channel fibers; where the first high-density optical connector and the second high-density optical connector are connected by an optical interconnection medium, and the first high-density optical connector is configured to connect the collected N optical fibers to the second high-density optical connector through the optical interconnection medium.

According to another embodiment of the present disclosure, an optical fiber connection method is provided. The method may include: collecting N optical fibers connected to both a first optical interconnection unit and an external light source, where N is a natural number greater than or equal to 1; and connecting the collected N optical fibers to a second high-density optical connector, K second optical interconnection units and the external light source, where the second high-density optical connector is configured to connect optical information channel fibers of the collected N optical fibers to the K second optical interconnection units, the K second optical interconnection units are configured to be networked by means of the optical information channel fibers, where K is a natural number greater than or equal to 1, and the external light source is configured to provide a modulated light source for the first optical interconnection unit; where a first high-density optical connector and the second high-density optical connector are connected by an optical interconnection medium, and the first high-density optical connector is configured to connect the collected N optical fibers to the second high-density optical connector through the optical interconnection medium.

According to yet another embodiment of the present disclosure, further provided is a computer-readable storage medium, storing a computer program which, when executed by a processor, causes the processor to implement any of the above method embodiments.

According to still another embodiment of the present disclosure, an electronic device is further provided. The device may include a processor, and a memory storing a computer program which, when executed by the processor, causes the processor to implement any of the above method embodiments.

BRIEF DESCRIPTION OF DRAWINGS

FIG. 2-1 is a layout diagram (1) of a first optical interconnection unit, a second optical interconnection unit and an external light source according to an embodiment of the present disclosure;

FIG. 2-2 is a layout diagram (2) of a first optical interconnection unit, a second optical interconnection unit and an external light source according to an embodiment of the present disclosure;

FIG. 2-3 is a diagram of logical relationship among a first optical interconnection unit, a second optical interconnection unit and an external light source according to an embodiment of the present disclosure;

FIG. 3 is a schematic diagram of an implementation principle of converging and splitting in an optical interconnection unit including only one CPO chip according to an embodiment of the present disclosure;

FIG. 5-1 is a rear view of a CPO converging and splitting device;

FIG. 5-2 is a top perspective view of a CPO converging and splitting device;

FIG. 5-3 is a front view of a CPO converging and splitting device;

FIG. 6-1 is a front view of a CPO converging and splitting device;

FIG. 6-2 is a side perspective view of a CPO converging and splitting device;

FIG. 7-1 is a rear view of a CPO converging and splitting device;

FIG. 7-2 is a top perspective view of a CPO converging and splitting device;

FIG. 7-3 is a front view of a CPO converging and splitting device;

DETAILED DESCRIPTION

Hereinafter, embodiments of the present disclosure will be described in detail below with reference to the drawings and in conjunction with the embodiments.

It should be noted that the terms "first", "second", and the like in the description, claims and the accompanying drawings of the present disclosure are used to distinguish similar objects, and are not necessarily used to describe a specific sequence or a precedence order.

In this embodiment, an optical fiber connection device is provided, including: a first high-density optical connector, and a second high-density optical connector.

The first high-density optical connector is connected to a first optical interconnection unit and an external light source, and configured to collect N optical fibers connected to both the first optical interconnection unit and the external light source and connect the collected N optical fibers to a second high-density optical connector, K second optical interconnection units and the external light source, where N and the K are both natural numbers greater than or equal to 1, and the external light source is configured to provide a modulated light source for the first optical interconnection unit.

The first high-density optical connector is connected to the K second optical interconnection units by the second high-density optical connector, where the K second optical interconnection units are configured to be networked by means of optical information channel fibers.

The first high-density optical connector and the second high-density optical connector are connected by an optical interconnection medium, and the first high-density optical connector is configured to connect the collected N optical fibers to the second high-density optical connector through the optical interconnection medium.

Figure 1:
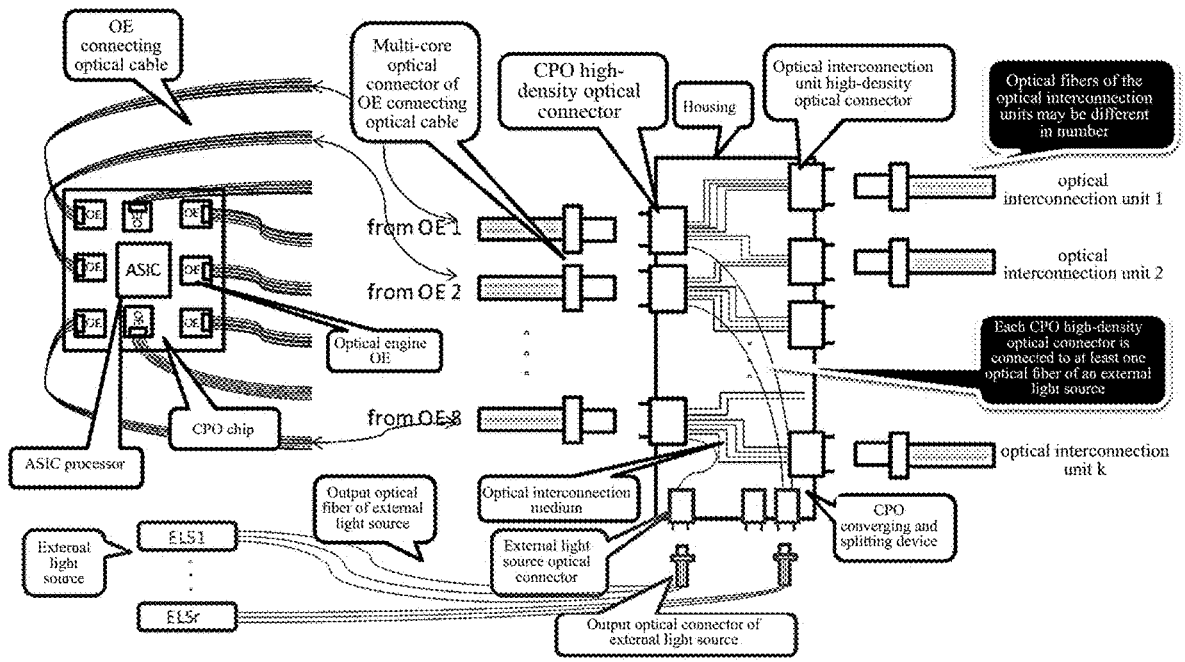
FIG. 1 is a schematic diagram of a converging and splitting method for CPO chip output optical fibers according to an embodiment of the present disclosure.
Figure 2:
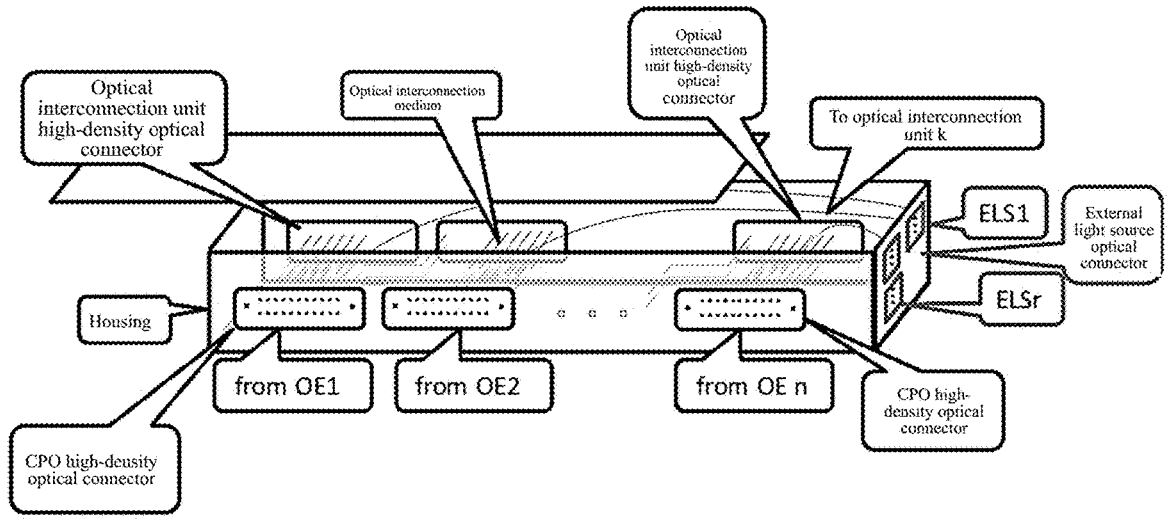
FIG. 2 is a schematic diagram of a CPO converging and splitting device according to an embodiment of the present disclosure.
Figures 1, 2:
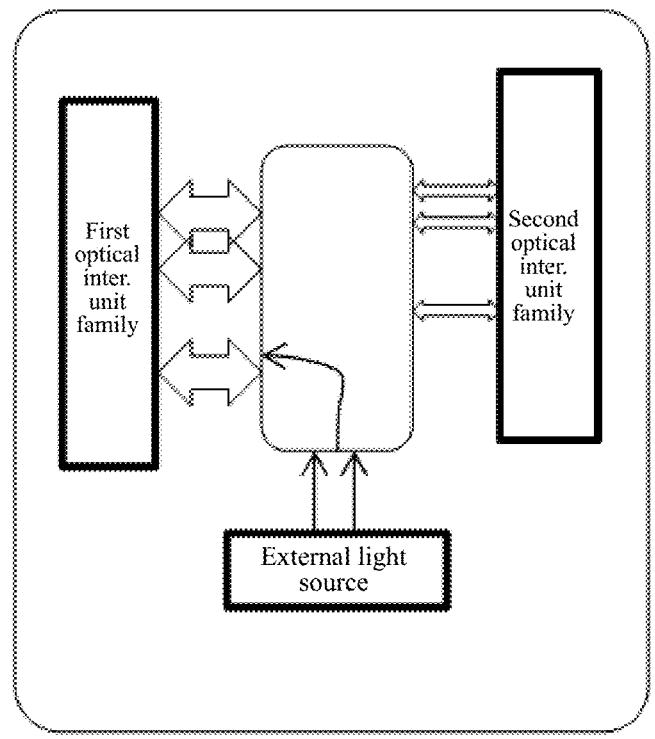
Figure 2:
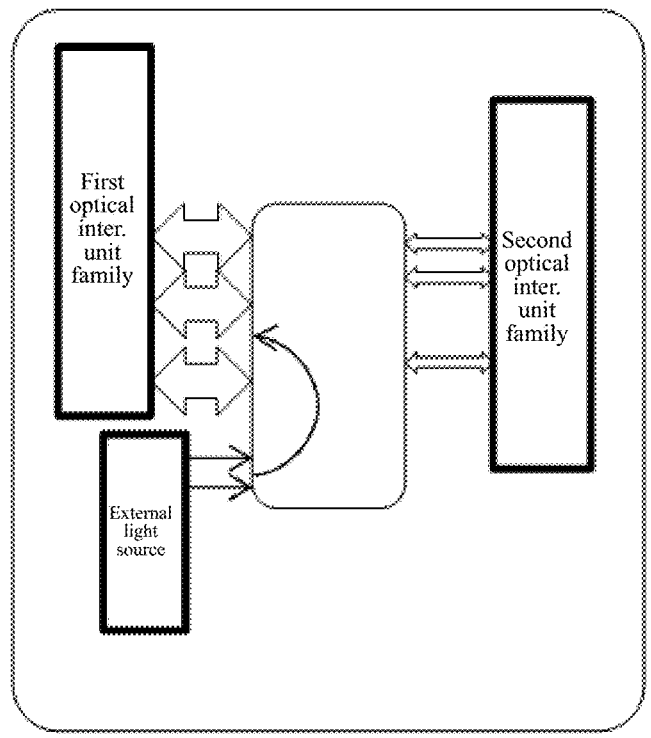
Figures 2, 3:
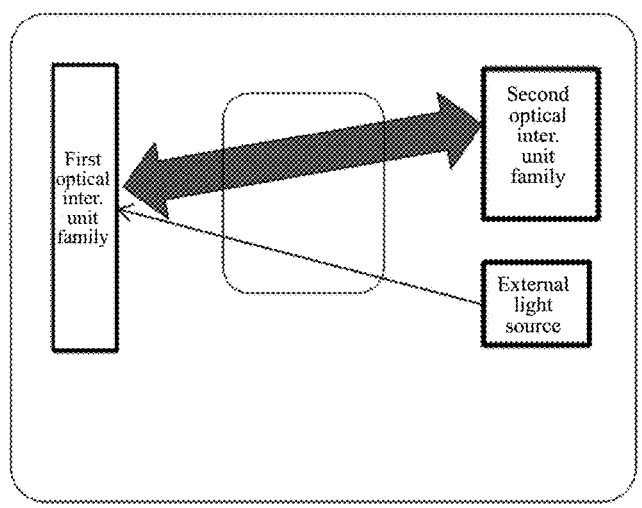
Figure 3:
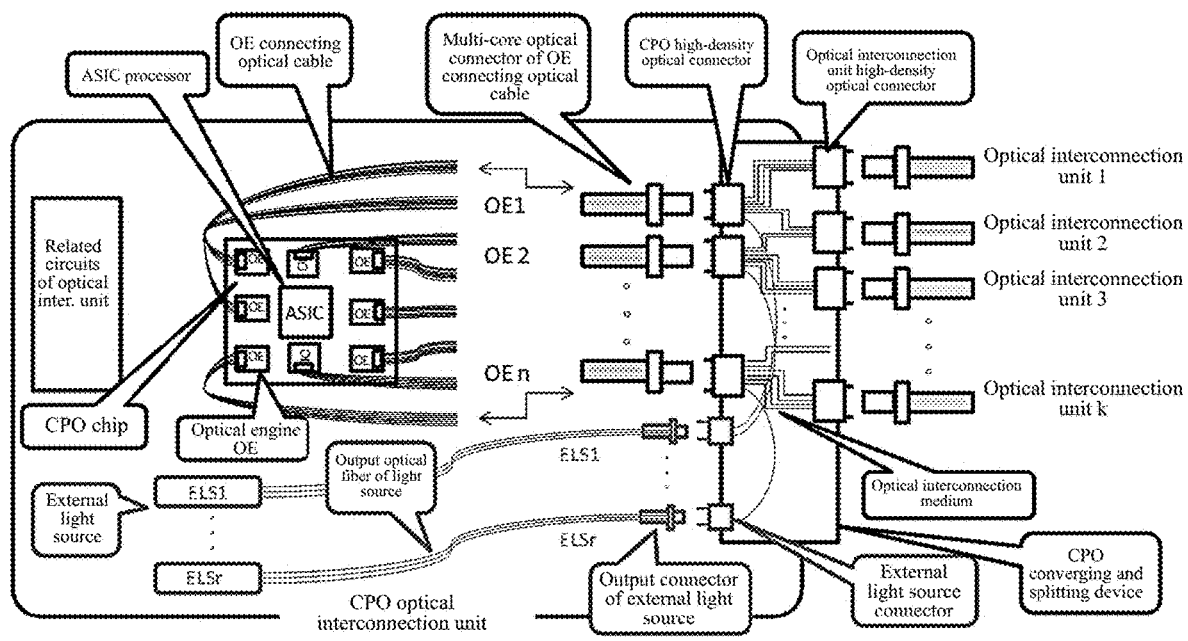

In an embodiment, the layout of the first optical interconnection unit, the second optical interconnection unit and the external light source is as shown in FIG. 2-1 and FIG. 2-2. The logical relationship among the first optical interconnection unit, the second optical interconnection unit and the external light source is shown in FIG. 2-3.

In this embodiment, the optical fiber connection device is arranged in a Co-packaged Optics (CPO) system apparatus.

In an embodiment which includes, but not limited to, the application in the networking scenario of optical interconnection units including CPO chips, the first high-density optical connector, the second high-density optical connector and the optical interconnection medium may be integrated in the same device (for example, a CPO converging and splitting device). For example, in an optical interconnection unit including a CPO chip, N optical fibers connected to both the first optical interconnection unit and the external light source are collected by means of one CPO converging and splitting device, and then are allocated to the second high-density optical connector connected to the CPO converging and splitting device through an optical interconnection medium. These optical connectors are allocated to k independent optical connectors and r external light source optical connectors according to the interconnection requirements of optical interconnection units of the whole network and the input requirements of CPO optical engines, where k is a natural number greater than or equal to 1. These k independent optical connectors are then connected to other corresponding optical interconnection units of the whole network, where optical paths in the k independent optical connectors may be different in number. The r external light source optical connectors are connected to the external light source.

In this embodiment, the first high-density optical connector includes, but not limited to, optical connectors connected to CPO optical engines in the first optical interconnection unit, called CPO high-density optical connectors. The second high-density optical connector includes, but not limited to, optical connectors interconnected with other optical interconnection units in the network built, called optical interconnection unit high-density optical connectors.

In an embodiment, a third external light source optical connector is respectively connected to the first high-density optical connector and the external light source, and is configured to connect the external light source to an optical engine of a CPO chip and modulate laser light through a modulator to obtain a modulated laser signal. The modulated laser signal is used to output electrical channel information.

In this embodiment, the third external light source optical connector is connected to the external light source, and a unified processing of external light sources for the CPO optical engines can simplify the optical path connection.

In an embodiment, the first optical interconnection unit includes a CPO chip configured to output the N optical fibers. The CPO chip includes an optical engine which includes an optical cable with an optical connector. The optical cable includes N optical fibers configured to transmit N channels of light. The optical cable is connected to the first high-density optical connector, and is configured to connect the N optical fibers to the first high-density optical connector.

In this embodiment, the CPO chip is mainly configured for high-density and large-capacity optical interconnection between Application Specific Integrated Circuits (ASIC). One CPO chip may include multiple optical engines each outputting an optical cable with an optical connector, and each optical cable may include multiple optical fibers.

As shown in FIG. 1, the CPO chip includes two parts: an ASIC processor and optical engines. The CPO chip includes eight optical engines each connected to the outside through an optical cable and an attached optical connector.

In this embodiment, each optical engine may retain a certain length of connecting optical cable and a multi-core optical connector. When a multistage switching network CLOS is networked, it is required to connect the output optical fibers of the same optical engine to different optical interconnection units, or connect the optical cable of the optical engine to a distant place, such as 2 km. Alternatively, for an optical interconnection unit utilizing a CPO chip, when exchange data is received, it is required to reallocate the number of optical fibers for connection of the CPO chip according to actual situations. It is required to collect optical cables of the optical engines, and then reallocate the optical fibers according to the networking situation of the CLOS network. FIG. 1 shows on the right side a schematic connection diagram of an optical fiber converging and splitting device. On the left side of the CPO converging and splitting device are optical cables from Optical Engines (OE) together with multi-core optical connectors. As shown in FIG. 1, multi-core optical connectors connected to eight optical engines are directly connected to the converging and splitting device. In the CPO converging and splitting device, input optical signals are transmitted to k multi-core optical connectors on the right through an optical transmission medium, and then are correspondingly connected to k optical interconnection units (that is, other optical interconnection units).

Through this embodiment, interconnected optical fibers of the CPO chip can be allocated to different optical interconnection units according to the networking requirements of optical interconnection units, and the connection number is not limited by the number of optical engines in the CPO chip. In addition, the number of CPO high-density optical connectors varies depending on the number of optical cables connected to the optical engines.

In an embodiment, the device further includes: a housing configured to carry the first high-density optical connector, the second high-density optical connector and the optical interconnection medium.

In this embodiment, the CPO converging and splitting device is taken as an example for description. As shown in FIG. 2, the CPO converging and splitting device includes a housing, high-density optical connectors and an optical interconnection medium.

The housing mainly supports the high-density optical connectors and protects the optical interconnection medium inside. There are two types of high-density optical connectors: one type is connected to optical cables of optical engines inside a target optical switching unit, marked as "from OE x", and the other type is connected to optical cables of other optical switching units, marked as "to other optical interconnection units x". According to the actual situation, the high-density optical connectors of the CPO converging and splitting device may also be connected to optical fibers from the same side.

Through the CPO converging and splitting device shown in FIG. 2, two functions can be realized: one is to collect optical fibers in an optical interconnection unit to form a unified interface, and the other is to allocate and connect optical paths as required, such that the optical cables of the optical engines may be connected to the optical interconnection units at different spatial locations.

As shown in FIG. 2, the converging and splitting from n optical cables with input multi-core optical connectors to k optical interconnection units can be realized. In the k optical interconnection units, optical fiber data allocated to each optical interconnection unit may be different. For the optical interconnection unit utilizing the CPO, different external connection topologies can be implemented by simply replacing the converging and splitting devices for different CPO optical engine connectors.

In this embodiment, as shown in FIG. 3, the CPO chip is externally connected with eight optical cables with multi-core optical connectors and k optical interconnection unit high-density connectors. The multi-core optical connectors of the optical engines of the CPO chip are connected to the CPO converging and splitting device, optical paths are allocated to high-density optical connectors of the k optical interconnection units through the optical interconnection medium in this converging and splitting device, and connection and networking with other optical interconnection units can be realized through the k optical interconnection unit high-density connectors.

In one optical interconnection unit, according to actual situations, one or more CPO converging and splitting devices may be utilized.

In an embodiment, the second high-density optical connector is connected to optical channels in other optical interconnection units.

In an embodiment, the optical interconnection medium includes one of an optical fiber; or an optical waveguide.

To sum up, the multi-core optical connectors and high-density optical connectors of the CPO optical engines in this embodiment can be directly connected to an optical fiber signal distribution device in the embodiments. Optical fiber signals are transmitted to an output interface of the optical fiber signal distribution device through the optical interconnection medium. Then, the optical fiber signals are allocated to output connectors according to the connection requirements of the optical interconnection unit. The output optical high-density connectors are connected to the high-density optical connectors of other optical interconnection units.

Therefore, the optical interconnection unit can be efficiently interconnected with any number of other optical interconnection units according to the requirements of the CLOS network topology. The optical interconnection unit can allocate a required number of optical fibers, so as to be connected with other related equipment. Long-distance connection between this optical interconnection unit and other optical interconnection units can be realized.

In addition, decoupling the correlation between the number of optical engines of the CPO chip and the number of optical cables for externally networking/connecting of the optical interconnection unit can standardize the coupling mode of CPO chips and facilitate the manufacturing of CPO chips.

The present disclosure will be illustrated in combination with specific embodiments below.

In this embodiment, a first high-density optical connector, a second high-density optical connector, an optical interconnection medium and a housing are integrated in a CPO converging and splitting device. The first high-density optical connector is illustrated by taking a CPO high-density optical connector as an example, and the second high-density optical connector is illustrated by taking an optical interconnection unit high-density connector as an example.

Example Embodiment One: An Implementation Method for a Single CPO Converging and Splitting Device In this embodiment, the optical interconnection unit is divided into three parts, i.e., a CPO chip, related circuits, and external light sources.

As shown in FIG. 3, the CPO chip of the optical interconnection unit includes an ASIC processor, optical engines (OE), and optical cables with multi-core optical connectors for external connection. The CPO chip in FIG. 3 is externally connected with eight optical cables with multi-core optical connectors. The CPO converging and splitting device in this embodiment includes five parts: CPO high-density optical connectors, external light source optical connectors, optical interconnection unit high-density optical connectors, an optical interconnection medium and a housing. The CPO high-density optical connectors are connected with the CPO chip inside the optical interconnection unit. The optical interconnection unit high-density optical connectors are connected with optical channels of other optical interconnection units. The external light source optical connectors are connected with the external light sources.

The CPO converging and splitting device in FIG. 3 includes eight CPO high-density optical connectors, k optical interconnection unit high-density connectors and r external light source optical connectors. The multi-core optical connectors of the optical cables of the CPO chip are inserted into the CPO converging and splitting device. Then, optical fiber signals are allocated to the k optical interconnection unit high-density optical connectors through the optical interconnection medium in this converging and splitting device. Finally, connection and networking with other optical interconnection units can be realized through the k optical interconnection unit high-density optical connectors. It is assumed that there are n CPO high-density optical connectors, k optical interconnection unit high-density connectors and r external light source optical connectors. The external light sources are connected to the CPO converging and splitting device through the optical connectors, to be specific, are connected to the CPO high-density optical connectors through the optical interconnection medium, and are finally input to the CPO optical engines. The multi-core optical connectors of the optical cables of the CPO chip are inserted into the CPO converging and splitting device, then optical information channels are allocated to k optical interconnection unit high-density optical connectors through the optical interconnection medium in the device, and finally connection and networking with other optical interconnection units can be realized through the k optical interconnection unit high-density optical connectors.

Example Embodiment Two: An Implementation Method for Multiple CPO Converging and Splitting Devices In actual situations, there may also be the case where a built-in light source is adopted, that is, it is not required to configure an external light source. In this embodiment, the mode of adopting the built-in light source will be described.

According to the space, density and other conditions, multiple CPO converging and splitting devices may be utilized in one optical interconnection unit.

Figure 4:
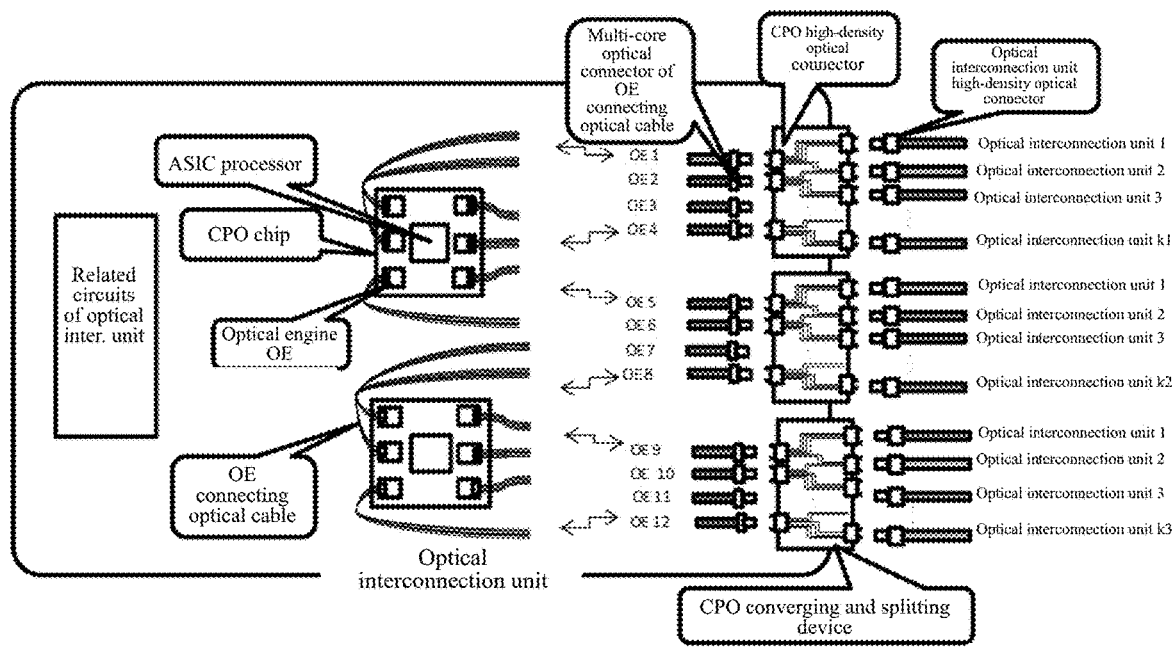
FIG. 4 is a schematic diagram of an implementation principle of converging and splitting in an optical interconnection unit including two CPO chips and three CPO converging and splitting devices according to an embodiment of the present disclosure (without external light source)

As shown in FIG. 4, the optical interconnection unit includes two CPO chips and three CPO converging and splitting devices. Each CPO chip leads out six optical cables with multi-core optical connectors, which are respectively connected to the three CPO converging and splitting devices. In order to show the universality of converging and splitting, k1, k2 and k3 optical interconnection unit high-density optical connectors are separated by the devices, thus the CPO optical interconnection unit can be interconnected to k1+k2+k3 optical interconnection units. Meanwhile, the remote optical connection of the CPO optical interconnection unit can be realized by the CPO converging and splitting devices.

The structure and function of each CPO converging and splitting device are similar to those in the implementation method for a single CPO converging and splitting device, with the difference lying in that the CPO converging and splitting device does not need to be connected to an external light source, that is, all the connecting optical fibers of 12 optical engines (OE) have only information optical paths, but no light source optical path. The structure and function of the CPO converging and splitting device are the same as those in the implementation method for a single CPO converging and splitting device, reference may be made to Example Embodiment One for details, which will not be repeated here.

Figure 8:
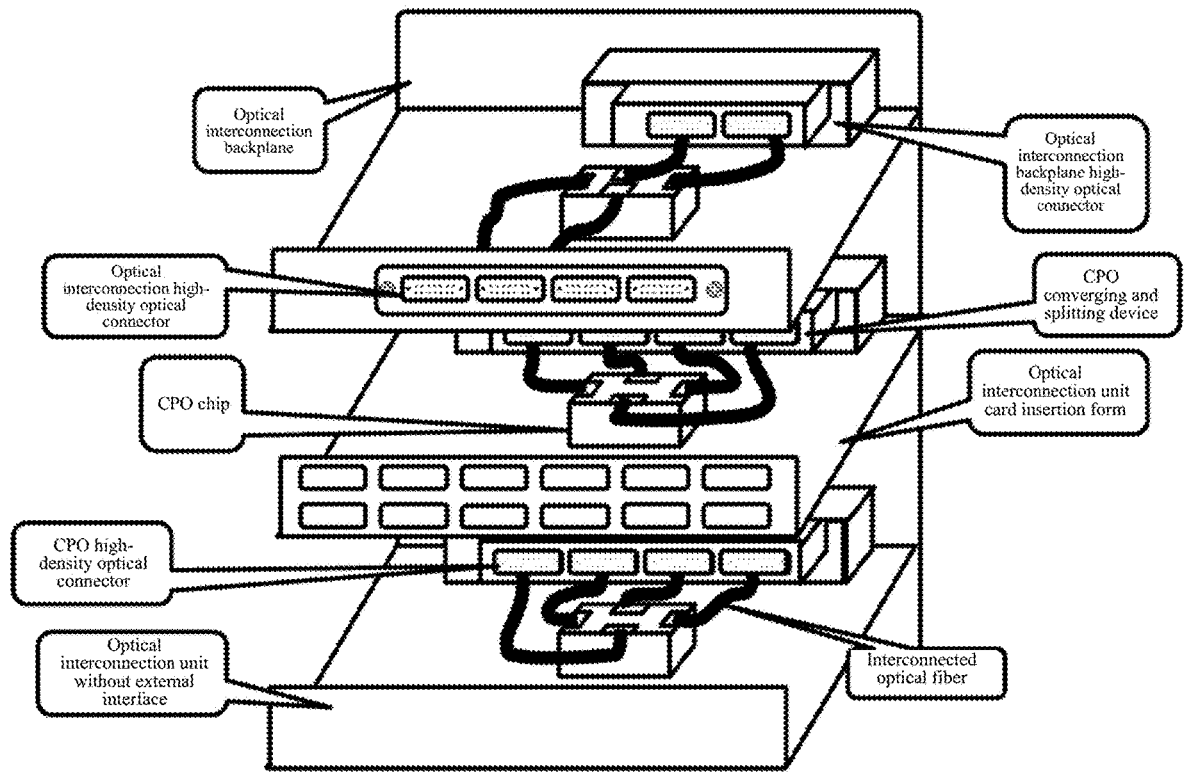
FIG. 8 is a schematic diagram of an implementation mode of a CPO converging and splitting device of an optical interconnection unit adopting a rear optical backplane.

Example Embodiment Three: An Implementation Method for a CPO Converging and Splitting Device of an Optical Interconnection Unit Adopting a Rear Optical Backplane On the level of optical interconnection equipment, as shown in FIG. 8, an optical interconnection system is composed of three optical interconnection units and an optical interconnection backplane, where each optical interconnection unit includes a CPO chip, an external light source and a CPO converging and splitting device.

In each optical interconnection unit, the external light source is connected to the CPO converging and splitting device through an optical connector, then connected to a light source optical path of a CPO high-density optical connector through an optical interconnection medium, and finally enters an optical engine. For the CPO converging and splitting device adopting an external light source, each optical engine is connected with at least one optical fiber of the light source optical path.

There is a CPO chip, including four optical engines which are connected to the CPO high-density optical connectors of the CPO converging and splitting device. This optical interconnection unit is inserted into a high-density optical connector on the optical interconnection backplane. An optical interconnection unit high-density optical connector connected to the backplane side is connected to an optical transmission medium of the backplane to realize the optical network connection of the whole system. An optical interconnection unit high-density optical connector installed on the panel side is connected to the optical interconnection unit of an access sub-frame.

In the interconnection where all optical fibers of the signal optical path face the backplane, k in this case may take a value of 1 or other values, corresponding to different implementation methods for the optical backplane.

As shown in FIG. 8, there are two connection methods for optical fibers of the CPO signal optical path of a CPO optical interconnection unit. One method is that the CPO chip is connected to a backplane and panels at the same time through the optical fibers of the CPO converging and splitting device. The other method is that the CPO chip is only connected to the backplane through the optical fibers of the CPO converging and splitting device, where a front panel may or may not have an external interface.

Example Embodiment Four: An Implementation Method for a CPO Converging and Splitting Device of an Optical Interconnection Unit in the Form of a White Box Apparatus with Double-Sided Fiber Output As the optical interconnection unit adopts a CPO chip, the mode of fiber output at the panel side will also change. That is, the CPO optical fibers are directly output to a panel for connection. In this embodiment, an implementation method for a CPO converging and splitting device of an optical interconnection unit in the form of a white box with double-sided fiber output is proposed.

Figure 9:
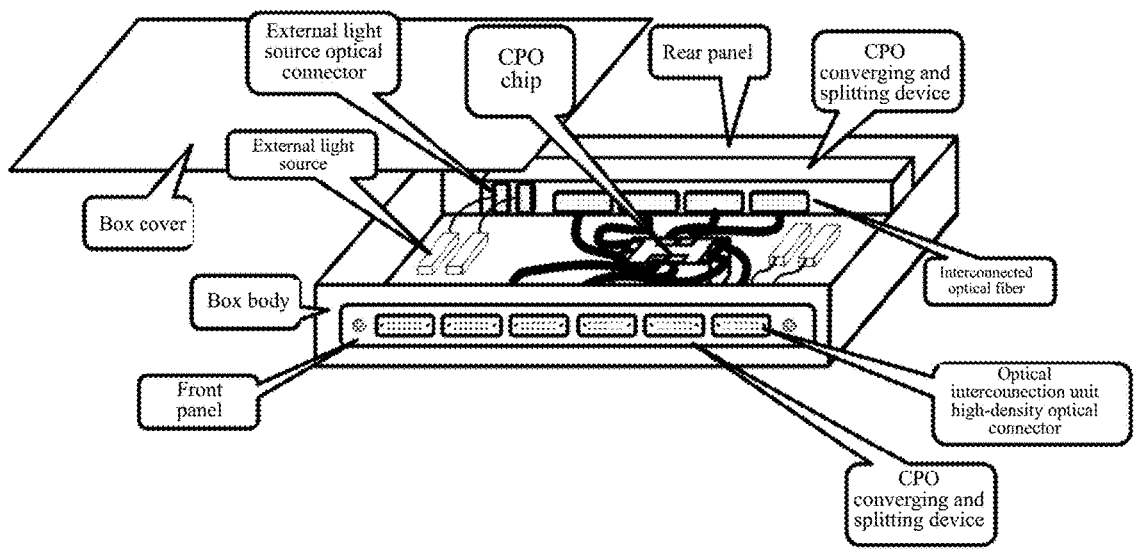
FIG. 9 is a schematic diagram of an implementation mode of a CPO converging and splitting device of an optical interconnection unit in the form of a white box apparatus with double-sided fiber output.

FIG. 9 shows a box switch utilizing a CPO chip and a CPO converging and splitting device. The box switch includes a CPO chip, external light sources, and a CPO converging and splitting device. In this embodiment, four external light sources are provided, four optical fibers are output, and a front panel and a rear panel are respectively connected with two optical fibers. These optical fibers are connected to optical engines of the CPO chip through the CPO converging and splitting device.

The CPO chip includes eight optical engines which are respectively connected to the CPO converging and splitting device through optical cables. Each of the front panel and the rear panel is provided with four CPO high-density optical connectors for external connection. Four CPO high-density optical connectors on the rear panel and other optical interconnection units form a larger network device through the CLOS network topology, and data to be processed is received from the front panel through the high-density optical connectors. This function can satisfy the functions of stage 1 and stage 3 in a three-stage CLOS network topology.

If the optical fibers of the front panel and the rear panel are all connected to similar optical interconnection units, the function of stage 2 in the three-stage CLOS network topology can be satisfied.

A white-box optical interconnection apparatus further includes a box body and a box cover, and is configured to contain and support the CPO chip and the CPO converging and splitting device.

In a practical method, the high-density optical connectors on the front panel and the rear panel may be placed on the same side as required. The distinction between the front panel and the rear panel here only shows that in an optical interconnection unit utilizing a CPO chip, the CPO converging and splitting device may serve to form a distributed white-box switch or forward data into a distributed white-box switching system.

Different external connection topologies of the white-box optical interconnection apparatus can be realized by replacing the CPO converging and splitting device.

Example Embodiment Five: A CPO Converging and Splitting Device Adopting an Optical Fiber as an Optical Interconnection Medium FIG. 5-1, FIG. 5-2 and FIG. 5-3 show a double-sided fiber connection device adopting an optical fiber as a CPO interconnection medium.

The CPO converging and splitting device includes: CPO high-density optical connectors, configured to connect CPO chips inside an optical interconnection unit; optical interconnection unit high-density connectors, configured to connect other optical interconnection units; external light source optical connectors, configured to connect external light sources; an optical interconnection medium, configured to realize the connection of the CPO high-density optical connectors, the optical interconnection unit high-density connectors, and the external light source optical connectors; and a housing, configured to fix the high-density optical connectors and protect the optical interconnection medium.

Figures 1, 5:
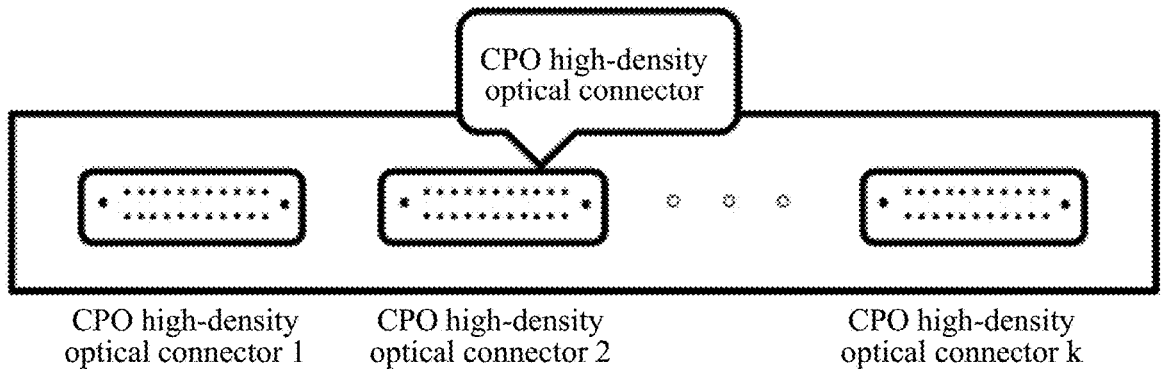
Figures 2, 5:
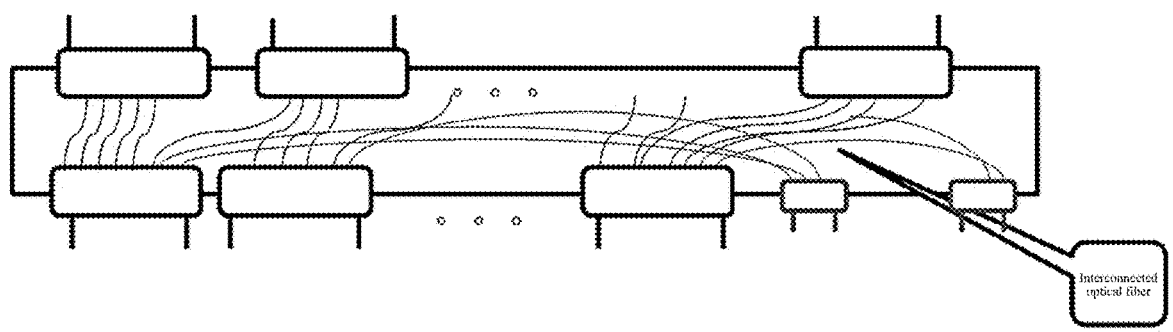
Figures 3, 5:
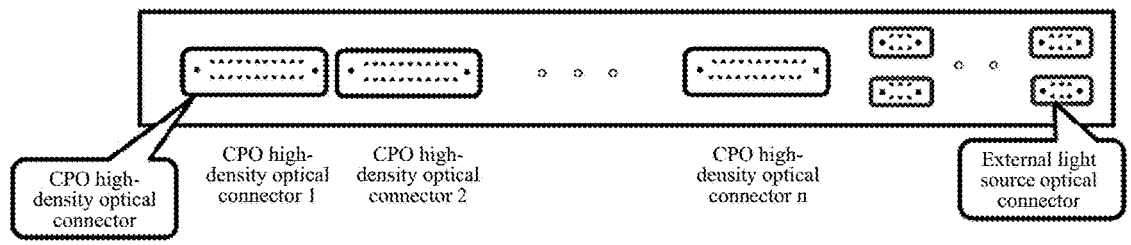

FIG. 5-1 is a schematic rear view of a CPO converging and splitting device, where n optical interconnection unit high-density optical connectors and r external light source optical connectors on the rear panel are configured for internal optical interconnection of the optical interconnection unit, including a signal optical path and a light source optical path.

FIG. 5-2 is a top perspective view of a CPO converging and splitting device. In this embodiment, an optical fiber is used as a connection medium to connect CPO optical fibers in an optical interconnection unit, external light sources and external optical interconnection units. This is because a coupling insertion loss between optical fiber connectors is relatively small, and an optical connection loss is also relatively small.

FIG. 5-3 is a schematic front view of a CPO converging and splitting device, where k optical interconnection unit high-density optical connectors on the front panel are configured for external connection of the optical interconnection unit.

Figures 1, 6:
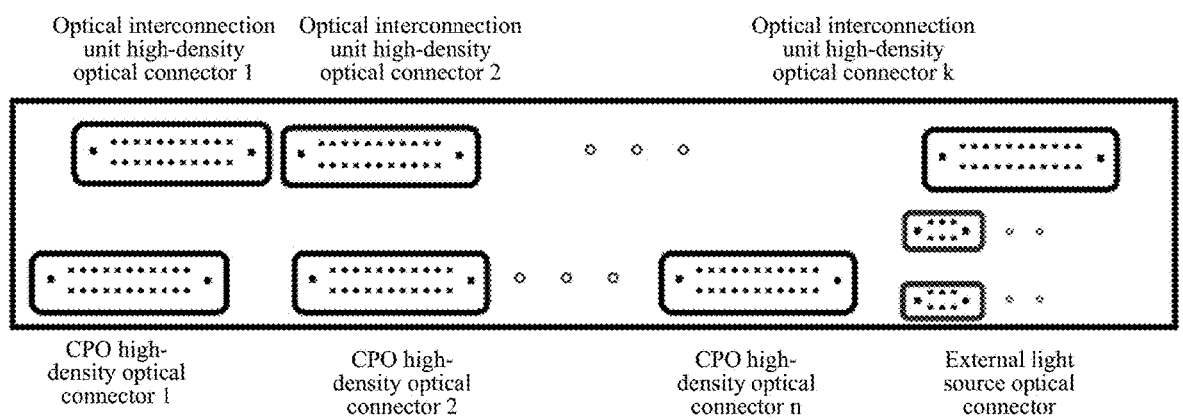
Figures 2, 6:
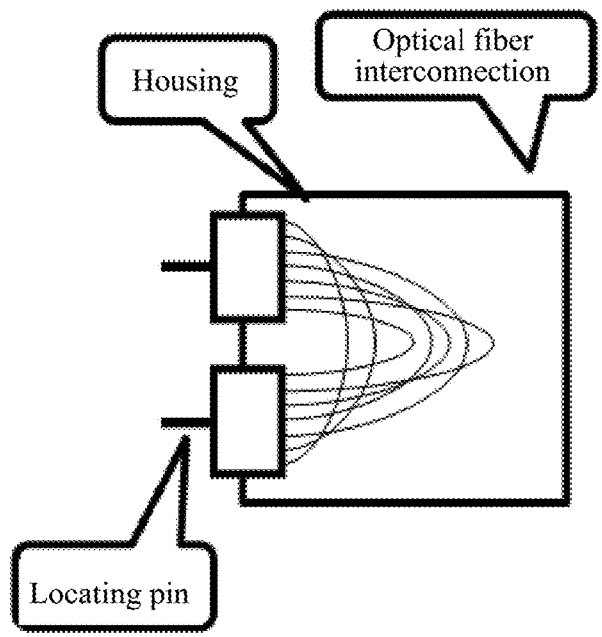

In this embodiment, according to actual situations, it is also possible to design a CPO converging and splitting device with single-sided fiber output, as shown in FIG. 6-1, which is a front view of a CPO converging and splitting device including n CPO high-density optical connectors and k optical interconnection unit high-density optical connectors. The n CPO high-density optical connectors are configured to connect CPO output optical fibers in the optical interconnection unit and output optical fibers of the external light source, and the k optical interconnection unit high-density optical connectors are configured to externally connect other optical interconnection units. FIG. 6-2 is a side perspective view of a CPO converging and splitting device, where an optical fiber interconnection medium is used as an optical interconnection medium.

Example Embodiment Six: A CPO Converging and Splitting Device Adopting an Optical Waveguide as an Optical Interconnection Medium As shown in FIG. 7-1, FIG. 7-2 and FIG. 7-3, a waveguide medium is adopted as an optical interconnection medium of the CPO converging and splitting device. The main difference is that an optical waveguide board is required to be used as an interconnection carrier when adopting a waveguide as an optical interconnection medium. The use of waveguide interconnection is mainly because the waveguide board occupies a relatively small space. Meanwhile, due to the good compatibility between the waveguide board and a PCB, it is convenient to add some photoelectric interaction functions.

Figures 1, 7:
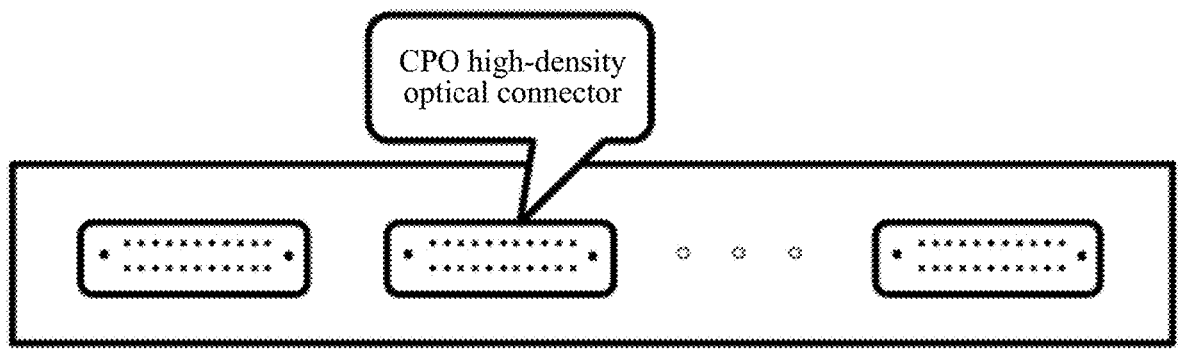
Figures 2, 7:
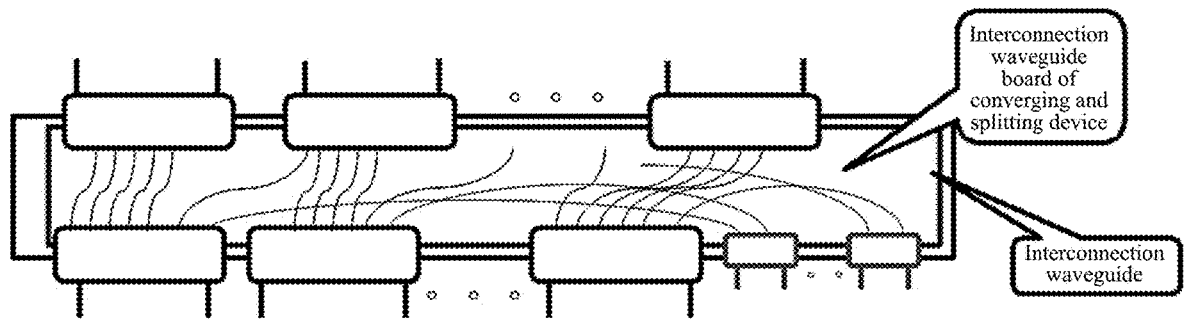
Figures 3, 7:
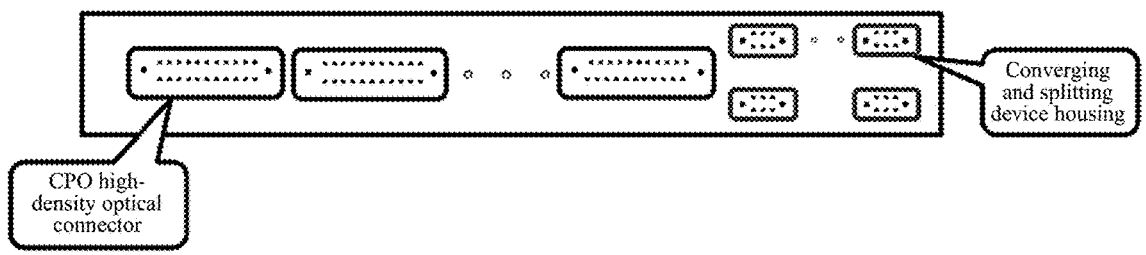

FIG. 7-1 shows a rear view of a CPO converging and splitting device; FIG. 7-2 shows a top perspective view of a CPO converging and splitting device; and FIG. 7-3 shows a front view of a CPO converging and splitting device. Specific composition and connection methods are similar to those in Example Embodiment Five, which will not be repeated here.

Figure 10:
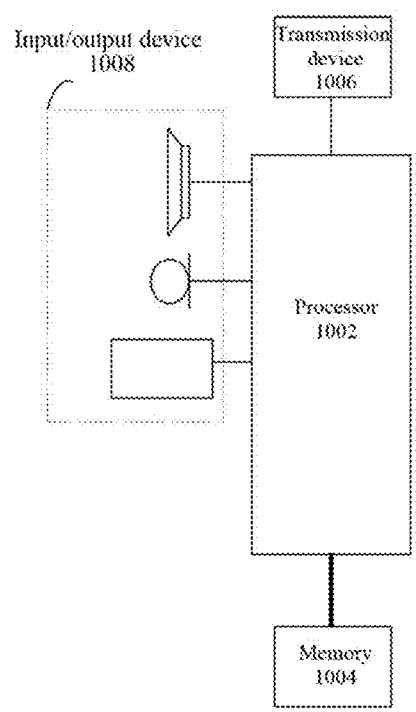
FIG. 10 is a block diagram of a hardware structure of a mobile terminal applying an optical fiber connection method according to an embodiment of the present disclosure.

In an embodiment, the method embodiment provided in the embodiment of the present disclosure may be implemented in a mobile terminal, a computer terminal or a similar computing device. Here, implementation in a mobile terminal is taken as an example. FIG. 10 is a block diagram of a hardware structure of a mobile terminal applying an optical fiber connection method according to an embodiment of the present disclosure. As shown in FIG. 10, the mobile terminal may include one or more (only one is shown in FIG. 10) processors 1002 (the processor 1002 may include, but not limited to, a processing device such as a Microcontroller Unit (MCU), a Field Programmable Gate Array (FPGA) or the like) and a memory 1004 for storing data. The mobile terminal may further include a transmission device 1006 for communication functions and an input/output device 1008. Those having ordinary skills in the art can understand that the structure shown in FIG. 10 is only schematic, and are not intended to limit the structure of the above-mentioned mobile terminal. For example, the mobile terminal may include more or fewer components than shown in FIG. 10, or have a different configuration from that shown in FIG. 10.

The memory 1004 may be configured to store computer programs, for example, software programs and modules of application software, such as computer programs corresponding to the optical fiber connection method in the embodiments of the present disclosure. The computer programs stored in the memory 1004, when executed by the processor 1002, cause the processor 1002 to implement various functional applications and data processing, that is, implements the above method. The memory 1004 may include a high-speed random access memory, and may further include a non-volatile memory, such as one or more magnetic storage devices, flash memory, or other non-volatile solid-state memory. In some examples, the memory 1004 may further include memories remotely located with respect to the processor 1002, and these remote memories may be connected to a mobile terminal through networks. Examples of the above networks include, but are not limited to, the Internet, an intranet, a local area network, a mobile communication network and combinations thereof.

The transmission device 1006 is configured to receive or send data via a network. Examples of the above networks may include wireless networks provided by communication providers of the mobile terminal. In an example, the transmission device 1006 includes a Network Interface Controller (NIC), which may be connected with other network devices through a base station for communication with the Internet. In an example, the transmission device 1006 may be a Radio Frequency (RF) module, which is configured to communicate with the Internet in a wireless manner.

Figure 11:
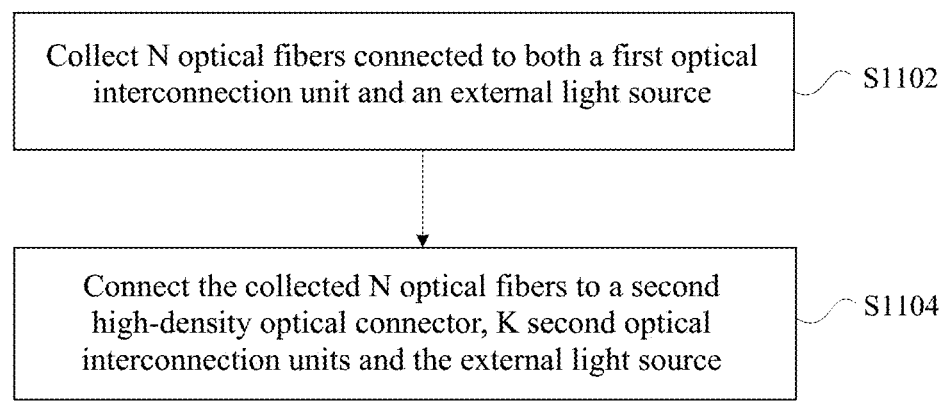
FIG. 11 is a flowchart of an optical fiber connection method according to an embodiment of the present disclosure.

In this embodiment, an optical fiber connection method is provided. FIG. 11 is a flowchart of an optical fiber connection method according to an embodiment of the present disclosure. As shown in FIG. 11, the process includes following steps S1102 to S1104.

At S1102, N optical fibers connected to both a first optical interconnection unit and an external light source are collected, where N is a natural number greater than or equal to 1.

At S1104, the collected N optical fibers are connected to a second high-density optical connector, K second optical interconnection units and the external light source, where the second high-density optical connector is configured to connect optical information channel fibers of the collected N optical fibers to the K second optical interconnection units, the K second optical interconnection units are configured to be networked by means of the optical information channel fibers, K being a natural number greater than or equal to 1, and the external light source is configured to provide a modulated light source for the first optical interconnection unit.

A first high-density optical connector and the second high-density optical connector are connected by an optical interconnection medium, and the first high-density optical connector is configured to connect the collected N optical fibers to the second high-density optical connector through the optical interconnection medium.

A subject performing the above steps may be, but not limited to, the first high-density optical connector, etc.

Through the above steps, the first high-density optical connector collects N optical fibers connected to both the first optical interconnection unit and the external light source, and the first high-density optical connector connects the collected N optical fibers to the second high-density optical connector through the optical interconnection medium, so as to instruct the second high-density optical connector to distribute the collected N optical fibers to K second optical interconnection units. Thus, the problems of low networking efficiency of optical interconnection units and complex connection can be solved, and the effects of improving networking efficiency of optical interconnection units and simplifying optical fiber interconnection can be achieved.

Through the description of the above implementation methods, those having ordinary skills in the art can clearly understand that the method according to the above embodiments can be implemented with the aid of software and necessary general hardware platform, and of course may also be implemented by hardware, but in many cases the former is a better implementation method. Based on this understanding, the technical schemes of the present disclosure essentially or the part that contributes to the existing technology can be embodied in the form of a software product. The computer software product is stored in a storage medium (for example, ROM/RAM, magnetic disc or compact disc), and includes several instructions for instructing a terminal device (which may be a mobile phone, a computer, a server, a network device or the like) to implement the method in any one of the embodiments of the present disclosure.

An embodiment of the present disclosure further provides a computer-readable storage medium, storing a computer program which, when executed by a processor, causes the processor to implement any the above method embodiments.

In an embodiment, the computer-readable storage medium may include, but not limited to, a USB flash disk, a Read-Only Memory (ROM), a Random Access Memory (RAM), a mobile hard disk, a magnetic disc, a compact disc and other media that can store computer programs.

An embodiment of the present disclosure further provides an electronic device. The electronic device includes a processor, and a memory storing a computer program which, when executed by the processor, causes the processor to implement any of the above method embodiments.

In an embodiment, the electronic device may further include a transmission device and an input/output device. The transmission device is connected to the processor, and the input/output device is connected to the processor.

According to the present disclosure, an optical fiber connection device includes: a first high-density optical connector, connected to a first optical interconnection unit and an external light source, and configured to collect N optical fibers connected to both the first optical interconnection unit and the external light source and connect the collected N optical fibers to a second high-density optical connector, K second optical interconnection units and the external light source, where N and K are natural numbers greater than or equal to 1, and the external light source is configured to provide a modulated light source for the first optical interconnection unit; and the second high-density optical connector, through which the first high-density optical connector is connected to the K second optical interconnection units, where the K second optical interconnection units are configured to be networked by means of optical information channel fibers. The first high-density optical connector and the second high-density optical connector are connected by an optical interconnection medium, and the first high-density optical connector is configured to connect the collected N optical fibers to the second high-density optical connector through the optical interconnection medium. Therefore, the problems of low networking efficiency of optical interconnection units and complex connection can be solved, and the effects of improving networking efficiency of optical interconnection units and simplifying optical fiber interconnection can be achieved.

For specific examples in this embodiment, reference may be made to the examples described in the above embodiment and other embodiments, which will not be repeated herein.

Obviously, those having ordinary skills in the art should understand that the above-mentioned modules or steps of the present disclosure may be realized by a general computing device, may be concentrated on a single computing device or distributed on a network composed of multiple computing devices, and may be realized by program codes executable by computing devices, so that they can be stored in storage devices and executed by computing devices. Moreover, in some cases, the steps shown or described may be performed in a different order from the orders as shown herein, or may be implemented by making them into individual integrated circuit modules or making a plurality of modules or steps thereof into a single integrated circuit module. In this way, the present disclosure is not limited to any particular combination of hardware and software.

All embodiments described above are just some embodiments of the present disclosure and are not intended to limit the present disclosure. It is apparent to those having ordinary skills in the art that various changes and variations may be made to the present disclosure. Any modification, equivalent replacement, improvement, and the like made within the principle of the present disclosure shall fall within the protection scope of the present disclosure.

What is claimed is:

1. An optical fiber connection device, comprising:
   N first high-density optical connectors, connected to a first optical interconnection unit and an external light source, and configured to collect optical fibers in N optical cables connected to both the first optical interconnection unit and the external light source and connect the collected optical fibers in the N optical cables to K second high-density optical connectors connected respectively with K second optical interconnection units, wherein N and K are both natural numbers greater than 1, and the external light source is configured to provide a modulated light source for the first optical interconnection unit; and
   the K second high-density optical connectors, through which the N first high-density optical connectors are connected to the K second optical interconnection units, wherein the K second optical interconnection units are configured to be networked by means of optical information channel fibers;
   wherein the N first high-density optical connectors and the K second high-density optical connectors are connected by an optical interconnection medium respectively, and
   the N first high-density optical connectors are configured to connect the collected optical fibers in the N optical cables to the K second high-density optical connectors through the optical interconnection medium.

2. The device of claim 1, further comprising:
   a third external light source optical connector, connected to the N first high-density optical connectors and the external light source respectively, configured to connect the external light source to an optical engine of a Co-packaged Optics (CPO) chip, and
   configured to modulate laser light through a modulator to obtain a modulated laser signal, wherein the modulated laser signal is configured to output electrical channel information.

3. The device of claim 1, wherein the first interconnection unit comprises:
   a CPO chip, configured to output the optical fibers in the N optical cables.

4. The device of claim 3, wherein the CPO chip comprises:
   N optical engines each comprising a respective one of the N optical cables with an optical connector.

5. The device of claim 1, further comprising:
   a housing, configured to carry the N first high-density optical connectors, the K second high-density optical connectors and the optical interconnection medium.

6. The device of claim 1, wherein:
   the K second high-density optical connectors are connected to the optical information channel fibers in the K second optical interconnection units.

7. The device of claim 1, wherein the optical interconnection medium comprises one of:
   an optical fiber; or
   an optical waveguide.

8. An optical fiber connection method, comprising:
collecting optical fibers in N optical cables connected to both a first optical interconnection unit and an external light source, wherein N is a natural number greater than 1; and
connecting the collected optical fibers in the N optical cables to K second high-density optical connectors connected respectively with K second optical interconnection units, wherein the K second high-density optical connectors are configured to connect optical information channel fibers of the collected optical fibers in the N optical cables to the K second optical interconnection units, the K second optical interconnection units are configured to be networked by means of the optical information channel fibers, K being a natural number greater than 1, and the external light source is configured to provide a modulated light source for the first optical interconnection unit;

wherein N first high-density optical connectors and the K second high-density optical connector are connected by an optical interconnection medium respectively, and the N first high-density optical connectors are configured to connect the collected optical fibers in the N optical cables to the K second high-density optical connectors through the optical interconnection medium.

9. A non-transitory computer-readable storage medium, storing a computer program which, when executed by a processor, causes the processor to perform the method of claim 8.

10. An electronic device comprising a processor, and a memory storing a computer program which, when executed by the processor, causes the processor to perform the method of claim 8.

* * * * *